(12) United States Patent
Byrne et al.

(10) Patent No.: US 9,879,154 B2
(45) Date of Patent: *Jan. 30, 2018

(54) LIQUID-APPLIED WATERPROOFING MEMBRANE FOR ROOFS COMPRISING TWO DIFFERENT ALDIMINES

(71) Applicant: SIKA TECHNOLOGY AG, Baar (CH)

(72) Inventors: Michael Byrne, Lytham (GB); Mark Gatrell, Chipping Preston (GB); Alexander Coward, Sale (GB); Urs Burckhardt, Zurich (CH)

(73) Assignee: SIKA TECHNOLOGY AG, Baar (CH)

( * ) Notice: Subject to any disclaimer, the term of this patent is extended or adjusted under 35 U.S.C. 154(b) by 75 days.

This patent is subject to a terminal disclaimer.

(21) Appl. No.: 14/762,379

(22) PCT Filed: Jan. 21, 2014

(86) PCT No.: PCT/EP2014/051138
§ 371 (c)(1),
(2) Date: Jul. 21, 2015

(87) PCT Pub. No.: WO2014/114642
PCT Pub. Date: Jul. 31, 2014

(65) Prior Publication Data
US 2015/0361299 A1    Dec. 17, 2015

(30) Foreign Application Priority Data

Jan. 22, 2013 (EP) ..................................... 13152265

(51) Int. Cl.
| | | |
|---|---|---|
| *C08G 18/12* | (2006.01) | |
| *C08G 18/30* | (2006.01) | |
| *C08G 18/32* | (2006.01) | |
| *C08G 18/75* | (2006.01) | |
| *C08G 18/79* | (2006.01) | |
| *C09D 175/04* | (2006.01) | |
| *C09D 175/12* | (2006.01) | |
| *E04D 7/00* | (2006.01) | |

(52) U.S. Cl.
CPC ........... *C09D 175/04* (2013.01); *C08G 18/12* (2013.01); *C08G 18/307* (2013.01); *C08G 18/3256* (2013.01); *C08G 18/755* (2013.01); *C08G 18/792* (2013.01); *C09D 175/12* (2013.01); *E04D 7/00* (2013.01); *C08G 2190/00* (2013.01)

(58) Field of Classification Search
CPC .... C08G 18/755; C08G 18/792; C08G 18/12; C08G 18/307; C08G 18/3256; C08G 2190/00; C09D 175/04; C09D 175/12; E04D 7/00
See application file for complete search history.

(56) References Cited

U.S. PATENT DOCUMENTS

| | | | |
|---|---|---|---|
| 5,087,661 A | 2/1992 | Aoki et al. | |
| 5,466,769 A | 11/1995 | Chou | |
| 5,506,329 A | 4/1996 | Chou | |
| 5,571,922 A | 11/1996 | Chou | |
| 5,591,819 A | 1/1997 | Chou | |
| 8,759,455 B2* | 6/2014 | Zahn ...................... | C08G 18/10 |
| | | | 156/331.7 |
| 9,512,341 B2 | 12/2016 | Voci et al. | |
| 2005/0065276 A1 | 3/2005 | Burckhardt et al. | |
| 2006/0122352 A1 | 6/2006 | Burckhardt | |
| 2007/0276058 A1 | 11/2007 | Burckhardt et al. | |
| 2008/0114146 A1 | 5/2008 | Burckhardt | |
| 2009/0099333 A1 | 4/2009 | Burckhardt | |
| 2010/0009076 A1 | 1/2010 | Walther et al. | |
| 2010/0101455 A1 | 4/2010 | Burckhardt | |
| 2012/0045652 A1 | 2/2012 | Zahn et al. | |
| 2012/0220736 A1 | 8/2012 | Burckhardt | |
| 2013/0280536 A1 | 10/2013 | Voci et al. | |
| 2015/0353769 A1* | 12/2015 | Byrne .................. | C08G 18/755 |
| | | | 52/309.1 |
| 2015/0353770 A1* | 12/2015 | Burckhardt .......... | C08G 18/755 |
| | | | 442/1 |

FOREIGN PATENT DOCUMENTS

| | | |
|---|---|---|
| CN | 101484491 A | 7/2009 |
| EP | 2 017 260 A1 | 1/2009 |
| EP | 2 236 534 A1 | 10/2010 |
| JP | 9-286836 A | 11/1997 |
| JP | 2007-332257 A | 12/2007 |
| KR | 10-0949599 B1 | 3/2010 |
| WO | WO 95/11933 A1 | 5/1995 |
| WO | WO 2004/013200 A1 | 2/2004 |
| WO | WO 2008/000831 A1 | 1/2008 |
| WO | WO 2009/010522 A1 | 1/2009 |
| WO | 2012/084806 A2 | 6/2012 |
| WO | WO 2013/182234 A1 | 12/2013 |
| WO | WO 2014/114639 A1 | 7/2014 |
| WO | WO 2014/114643 A1 | 7/2014 |

OTHER PUBLICATIONS

Patent Examination Report No. 1 issued by Australian Government IP Australia dated Sep. 7, 2016 in corresponding Australian Patent Application No. 2014209985.

(Continued)

*Primary Examiner* — Patrick Niland
(74) *Attorney, Agent, or Firm* — Buchanan Ingersoll & Rooney PC

(57) ABSTRACT

A one-part moisture-curing liquid-applied waterproofing membrane is disclosed as including a polyurethane polymer and two different aldimines as blocked amine hardeners in a specific ratio range. The membrane has a low odor, a long shelf life stability, a low viscosity at low solvent content, a sufficiently long open time to allow hand application and cures fast to a solid elastic material. The liquid-applied waterproofing membrane is particularly suitable for roofing applications, possessing high strength, high elongation and good durability under outdoor weathering conditions in a broad temperature range.

22 Claims, No Drawings

(56) References Cited

OTHER PUBLICATIONS

International Search Report (PCT/ISA/210) dated Apr. 15, 2014, by the European Patent Office as the International Searching Authority for International Application No. PCT/EP2014/051140.
Written Opinion (PCT/ISA/237) dated Apr. 15, 2014, by the European Patent Office as the International Searching Authority for International Application No. PCT/EP2014/051140.
Thomson Scientific, London, GB; An 2010-D86281 X002721224.
International Search Report (PCT/ISA/210) dated Mar. 6, 2014, by the European Patent Office as the International Searching Authority for International Application No. PCT/EP2014/051138.
Written Opinion (PCT/ISA/237) dated Mar. 6, 2014, by the European Patent Office as the International Searching Authority for International Application No. PCT/EP2014/051138.
International Search Report (PCT/ISA/210) dated Mar. 6, 2014, by the European Patent Office as the International Searching Authority for International Application No. PCT/EP2014/051137.
Written Opinion (PCT/ISA/237) dated Mar. 6, 2014, by the European Patent Office as the International Searching Authority for International Application No. PCT/EP2014/051137.
International Search Report (PCT/ISA/210) dated Feb. 25, 2014, by the European Patent Office as the International Searching Authority for International Application No. PCT/EP2014/051135.
Written Opinion (PCT/ISA/237) dated Feb. 25, 2014, by the European Patent Office as the International Searching Authority for International Application No. PCT/EP2014/051135.
International Search Report (PCT/ISA/210) dated Apr. 25, 2014, by the European Patent Office as the International Searching Authority for International Application No. PCT/EP2014/051134.
Written Opinion (PCT/ISA/237) dated Apr. 25, 2014, by the European Patent Office as the International Searching Authority for International Application No. PCT/EP2014/051134.
Thomson Scientific, London, GB; An 2010-D86281 XP002697879.
Office Action (Notification of the First Office Action) dated Mar. 21, 2017, by the State Intellectual Property Office of the People's Republic of China in corresponding Chinese Patent Application No. 201480004039.9, with an English translation of the Office Action (26 pages).
Office Action dated Nov. 7, 2017, by the Japanese Patent Office in corresponding Japanese Patent Application No. 2015-553125, and an English Translation of the Office Action. (14 pages).

\* cited by examiner

LIQUID-APPLIED WATERPROOFING MEMBRANE FOR ROOFS COMPRISING TWO DIFFERENT ALDIMINES

FIELD OF THE INVENTION

The invention relates to a liquid-applied waterproofing membrane based on one-part moisture-curing polyurethane, in particular for roofing applications.

BACKGROUND OF THE INVENTION

Liquid-applied waterproofing membranes are known. In roofing applications they are used as an alternative to prefabricated sheet membranes, offering easier application especially in the case of complex roof geometries and for refurbishment tasks, providing a flexible seamless roof coating which is fully adhered to the substrate.

Liquid-applied waterproofing membranes on roofs have to fulfill demanding requirements. They need to have a low viscosity to be applied as self-levelling coatings and a sufficiently long open time to enable hand application, but still cure fast in order to quickly lose their vulnerability and to be walkable at an early stage. When fully cured the roofing membrane needs to have durable elasticity and strength in order to protect the building effectively from water ingress in a broad temperature range and under outdoor weathering conditions, such as wind forces, ponding water, frost, strong sunlight irradiation, microbial attack and root penetration.

State-of-the-art liquid-applied waterproofing membranes are often reactive polyurethane compositions, formulated as one-part or as two-part systems, also called single-component or two-component systems, respectively. Two-part systems are more complex to apply, requiring special mixing equipment and proper metering of the two components, since mistakes in mixing quality and/or stoichiometry strongly affect the membrane performance. One-part systems are easy to apply, but prone to curing defects. State-of-the-art one-part systems comprise blocked amine hardeners, in particular oxazolidines, to prevent excessive gassing from carbon dioxide formation on curing. They generally contain considerable amounts of solvents to guarantee low viscosity and sufficient shelf life. Attempts spurred by tightening VOC regulation to reduce the solvent content of such one-part systems typically result in difficulties with shelf life stability and bad workability because of high viscosity, as the viscosity of the compositions starts on a higher level and increases further from premature crosslinking reactions between the NCO groups of the prepolymer and the oxazolidine hardeners during storage. Further drawbacks of oxazolidine-based one-part membranes are related to slow curing and unpleasant odours caused by the emission of the blocking agent, a volatile aldehyde or ketone.

WO2009/010522 discloses compostions containing Mannich base polyaldimines as blocked amine hardeners, which are usable i.a. as one-component elastic coatings, preferably for flooring purposes. With the dialdimines of the examples, the cure speed after skin formation is insufficient for the use as liquid-applied membrane.

WO2008/000831 discloses low VOC coating compositions, preferably for flooring purposes, which are based on aldol ester polyaldimines as blocked amine hardeners. While these compositions have good shelf life stability and cure without generating unpleasant odours, they are limited in strength development due to the low functionality hardener and the plasticizing effect of the aldol ester blocking agent. The coatings of the examples are either too stiff for roofing applications or contain high amounts of solvent, and the cure speed after skin formation is insufficient for the use as liquid-applied membrane.

SUMMARY OF THE INVENTION

The task of this invention is to provide a one-part liquid-applied waterproofing membrane useful for roofing applications having good shelf life stability and good workability at low solvent content, even when containing only about 50 g VOC per liter or less, as well as fast and reliable curing properties and high strength.

Surprisingly it was found that the liquid-applied waterproofing membrane according to claim 1 fulfills this task and has additional benefits. It comprises an isocyanate-functional polyurethane polymer providing good tensile strength and high elongation almost independent of temperature, remaining elastic also under cold climate conditions. It further comprises two different blocked amine hardeners—a Mannich base aldimine and an aldol ester aldimine—in a specific ratio range. The liquid-applied membrane comprising this combination of aldimines surprisingly affords a very attractive set of properties not reached by state-of-the-art membranes: a very good shelf life stability, a low viscosity even at low solvent content, good mechanical properties, particularly a high strength, and fast and reliable curing properties. Liquid-applied Membranes containing Mannich base aldimines only are higher in viscosity, and liquid-applied membranes containing aldol ester aldimines only are limited in strength. Combinations of the two aldimines enable membranes with very low viscosity at low solvent content together with high strength and elongation. The possibility of combining low solvent content with long shelf life and good mechanical properties provides the formulator with the unique opportunity to obtain a high-end product fulfilling toughest VOC regulations, having minimal shrinkage and a very low odour profile. The good mechanical properties afford high crack-bridging qualities in a broad temperature range and ensure high durability. Another aspect of the invention is the use of the aldol ester aldimine as a non-VOC diluent for Mannich base aldimine-based one-part moisture-curing liquid-applied waterproofing membranes, providing high quality membranes fulfilling toughest VOC regulations, having minimal shrinkage and a very low odour profile.

Other aspects of the invention are revealed in other independent claims. Preferred aspects of the invention are revealed in the dependent claims.

DETAILED DESCRIPTION OF THE INVENTION

The subject of the present invention is a one-part moisture-curing liquid-applied waterproofing membrane comprising
at least one isocyanate-functional polyurethane polymer;
at least one aldimine of the formula (I); and
at least one aldimine of the formula (II),

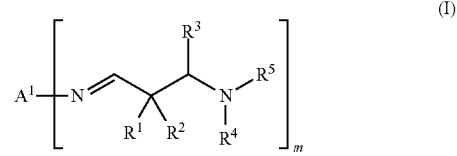

-continued

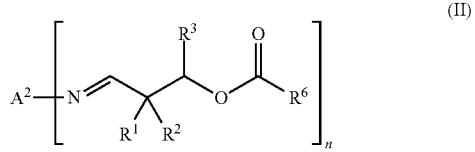

(II)

wherein
$A^1$ is an m-valent hydrocarbyl moiety of molecular weight in the range of 28 to 5,000 g/mol optionally containing ether or urethane groups,
$A^2$ is an n-valent hydrocarbyl moiety of molecular weight in the range of 28 to 5,000 g/mol optionally containing ether or urethane groups,
$R^1$ and $R^2$ are the same or different $C_1$ to $C_{12}$ linear or branched alkyls, or are joined together to form a divalent linear or branched $C_4$ to $C_{12}$ hydrocarbyl moiety which is part of a 5- to 8-membered carbocyclic ring,
$R^3$ is hydrogen or a linear or branched $C_1$ to $C_{12}$ alkyl or arylalkyl or alkoxycarbonyl,
$R^4$ and $R^5$ are the same or different linear or branched $C_1$ to $C_{20}$ alkyl or cycloalkyl or aralkyl optionally containing ether groups, or are joined together to form a divalent linear or branched $C_4$ to $C_{12}$ hydrocarbyl moiety which is part of a 5- to 8-membered heterocyclic ring which, besides the nitrogen atom, may contain an ether or thioether or tertiary amino group,
$R^6$ is a monovalent $C_6$ to $C_{20}$ hydrocarbyl moiety optionally containing ether, carbonyl or ester groups, and
m and n are from 2 to 6;
whereby the ratio between the number of the aldimino groups of the aldimine of the formula (I) and the number of the aldimino groups of the aldimine of the formula (II) is in the range of 90/10 to 50/50.

In this document, the term "one-part moisture-curing" refers to a liquid-applied membrane, which is contained in a single moisture-tight container, has a certain shelf life stability and cures when exposed to moisture.

In this document the term "liquid-applied waterproofing membrane" refers to a material which is applied in liquid form as a layer onto a substrate, and which cures to form an elastic membrane making the substrate waterproof.

In this document, the term "polyurethane polymer" includes all polymers prepared by the so-called diisocyanate polyaddition process. It includes isocyanate-functional polyurethane polymers obtained by reacting polyisocyanates and polyols, which may also be called prepolymers and are polyisocyanates themselves.

In this document, the term "shelf life stability" refers to the ability of a composition to be stored at room temperature in a suitable container under exclusion of moisture for a certain time interval, in particular several months, without under-going significant changes in application or end-use properties.

In this document, substance names starting with "poly", such as polyol, polyisocyanate or polyamine, refer to substances carrying two or more of the respective functional groups (e.g. OH groups in the case of polyol) per molecule.

In this document an amine or an isocyanate is called "aliphatic" when its amino group or its isocyanate group, respectively, is directly bound to an aliphatic, cycloaliphatic or arylaliphatic moiety. The corresponding functional group is therefore called an aliphatic amino or an aliphatic isocyanate group, respectively.

In this document an amine or an isocyanate is called "aromatic" when its amino group or its isocyanate group, respectively, is directly bound to an aromatic moiety. The corresponding functional group is therefore called an aromatic amino or an aromatic isocyanate group, respectively.

In this document, the term "primary amino group" refers to an $NH_2$-group bound to an organic moiety, and the term "secondary amino group" refers to a NH-group bound to two organic moieties which together may be part of a ring.

In this document the acronym "VOC" stands for "volatile organic compounds", which are organic substances having a vapour pressure of at least 0.01 kPa at a temperature of 293.14 K.

In this document, the term "solvent" refers to a liquid which is a VOC, which is able to dissolve isocyanate-functional polyurethane polymers as described in this document, and which does not carry any isocyanate-reactive functional groups.

In this document, "room temperature" refers to a temperature of 23° C.

In this document the term "molecular weight" refers to the molar mass (given in grams per mole) of a molecule or a part of a molecule, also referred to as "moiety". The term "average molecular weight" refers to the number-average molecular weight ($M_n$) of an oligomeric or polymeric mixture of molecules or moieties.

The liquid-applied membrane of this invention comprises at least one isocyanate-functional polyurethane polymer.

A suitable isocyanate-functional polyurethane polymer may be obtained from the reaction of at least one polyisocyanate with at least one polyol, whereby the isocyanate groups are in stoichiometric excess over the hydroxyl groups. The polyisocyanate and the polyol are brought to reaction via known methods, preferably at temperatures between 50 and 100° C., optionally by using a suitable catalyst. Preferably the polyisocyanate is used in an amount corresponding to an isocyanate to hydroxyl group ratio in the range of 1.3 to 5, more preferably 1.5 to 3. Preferably the polyurethane polymer has a free NCO group content in the range of 1 to 10 weight-%, preferably 2 to 8 weight-%. Optionally the polyol and the polyisocyanate may be reacted in the presence of a plasticizer or a solvent which are free from isocyanate-reactive groups.

Preferably the isocyanate-functional polyurethane polymer has an average molecular weight in the range of 1,000 to 10,000 g/mol, more preferably in the range of 1,000 to 5,000 g/mol.

Preferably the isocyanate-functional polyurethane polymer has an average isocyanate functionality in the range of 1.7 to 3, more preferably 1.8 to 2.5.

Suitable polyols for preparing the isocyanate-functional polyurethane polymer are polyether polyols, including those containing dispersed styrene-acrylonitrile (SAN), acrylonitrile-methylmethacrylate or urea particles, further polyester polyols such as products of the polycondensation reaction of diols or triols with lactones or dicarboxylic acids or their esters or anhydrides, further polycarbonate polyols, block copolymer polyols with at least two different blocks of polyether, polyester or polycarbonate units, polyacrylate and polymethacrylate polyols, polyhydroxy-functional fats and oils, especially natural fats and oils, and poly-hydrocarbon polyols, such as polyhydroxy-functional polyolefins.

Along with the above-mentioned polyols, small amounts of low molecular weight divalent or multivalent alcohols can be used, such as 1,2-ethanediol, 1,2-propanediol, neopentyl glycol, dibromoneopentyl glycol, diethylene glycol, triethylene glycol, the isomeric dipropylene glycols and tripropylene glycols, the isomeric butanediols, pentanediols, hexanediols, heptanediols, octanediols, nonanediols, decanediols, undecanediols, 1,3- and 1,4-cyclohexanedimethanol, hydrogenated bisphenol A, dimer fatty alcohols, 1,1,1-trimethylolethane, 1,1,1-trimethylolpropane, glycerol, pentaerythritol, sugar alcohols, such as xylitol, sorbitol or mannitol, sugars, such as saccharose, other polyhydric alcohols, low molecular weight alkoxylation products of the above-mentioned divalent or multivalent alcohols, as well as mixtures of the above-mentioned alcohols.

Preferred polyols are diols and triols with an average molecular weight in the range of 500 to 6,000 g/mol, particularly in the range of 1,000 to 5,000 g/mol.

Preferred polyols are polyether polyols, polyester polyols, polycarbonate polyols and polyacrylate polyols.

Particularly preferred polyols are polyether polyols, particularly polyoxyalkylenepolyols. These polyols help to develop good low temperature flexibility in the cured membrane.

Polyoxyalkylenepolyols are products of the polymerziation of ethylene oxide, 1,2-propylene oxide, 1,2- or 2,3-butylene oxide, oxetane, tetrahydrofuran or mixtures thereof, optionally polymerized using a starter molecule with two or more active hydrogen atoms, such as water, ammonia or compounds with several OH— or NH-groups, such as 1,2-ethanediol, 1,2- and 1,3-propanediol, neopentylglycol, diethyleneglycol, triethyleneglycol, the isomeric dipropylene-glycols and tripropyleneglycols, the isomeric butanediols, pentanediols, hexanediols, heptanediols, octanediols, nonanediols, decanediols, undecanediols, 1,3- and 1,4-cyclohexanedimethanol, bisphenol A, hydrogenated bisphenol A, 1,1,1-trimethylolethane, 1,1,1-trimethylolpropane, glycerol, aniline, as well as mixtures of the above-mentioned compounds.

Preferred are both polyoxyalkylenepolyols with a low degree of unsaturation (measured according to ASTM D-2849-69 and indicated in milliequivalents of unsaturation per gram of polyol (meq/g)), obtainable, for example, by using so-called double metal cyanide complex catalysts (DMC catalysts), and polyoxyalkylenepolyols with a higher degree of unsaturation, obtainable, for example, by using anionic catalysts such as NaOH, KOH, CsOH or alkali alcoholates. Particularly preferred polyoxyalkylenepolyols are polymerization products of ethylene oxide and/or propylene oxide.

More preferred are polyoxypropylenepolyols and so-called ethylene oxide endcapped polyoxypropylenepolyols. The latter are specific polyoxypropylene-po-lyoxyethylenepolyols obtainable by post-ethoxylating pure polyoxypropylenepolyols, thus featuring primary hydroxyl groups. These polyols enable good low temperature flexibility and good weathering properties in the cured membrane. Particularly preferred polyoxyalkylenepolyols are polyoxypropylenediols and -triols and ethylene oxide endcapped polyoxypropylenediols and -triols with an average molecular weight in the range of 500 to 6,000 g/mol, particularly in the range of 1,000 to 4,000 g/mol.

These polyether polyols provide a combination of low viscosity, good weathering properties and good mechanical properties in the cured membrane.

Further particularly preferred polyols are polycarbonate polyols, particularly products of the polycondensation of dialkyl carbonates, diaryl carbonates or phosgene with diols or triols such as ethylene glycol, diethylene glycol, propylene glycol, dipropylene glycol, neopentyl glycol, 1,4-butanediol, 1,5-pentanediol, 3-methyl-1,5-hexanediol, 1,6-hexanediol, 1,8-octanediol, 1,10-decanediol, 1,12-dodecanediol, 1,12-octadecanediol, 1,4-cyclohexane dimethanol, dimeric fatty acid diol (dimeryl diol), hydroxypivalic neopentylglycol ester, glycerol and 1,1,1-trimethylolpropane.

Such polycarbonate polyols can help to develop good weathering properties of the membrane.

Preferred low molecular weight alcohols are difunctional alcohols with a molecular weight in the range of 60 to 150 g/mol. Particularly preferred are 1,2-ethanediol, 1,3-propanediol, 1,4-butanediol, 1,5-pentanediol, 1,6-hexanediol, 1,3-cyclohexane dimethanol, 1,4-cyclohexane dimethanol and diethylene glycol. These alcohols improve particularly the strength of the membrane. Most preferred is 1,4-butanediol.

Further preferred low molecular weight alcohols are difunctional bromated alcohols such as dibromoneopentyl glycol. These alcohols improve particularly the flame retarding properties of the membrane.

Preferably the isocyanate-functional polyurethane polymer is prepared from a polyol mixture containing at least 50 weight-%, more preferably at least 80 weight-%, and most preferably at least 90 weight-%, of polyether polyols.

In a particularly preferred embodiment, the isocyanate-functional polyurethane polymer is obtained from a combination of at least one polyether polyol with a molecular weight in the range of 500 to 6,000 g/mol and at least one diol with a molecular weight in the range of 60 to 150 g/mol, particularly 1,4-butanediol. Such an isocyanate-functional polyurethane polymer shows a low viscosity and provides good mechanical properties, particularly high strength.

Suitable polyisocyanates to obtain the isocyanate-functional polyurethane polymer are the following:

Aliphatic polyisocyanates, particularly 1,4-tetramethylene diisocyanate, 2-methylpentamethylene-1,5-diisocyanate, 1,6-hexanediisocyanate (HDI), 2,2,4- and 2,4,4-trimethyl-1,6-hexanediisocyanate (TMDI), 1,10-decane-diisocyanate, 1,12-dodecanediisocyanate, lysine or lysine ester diisocyanate, cyclohexane-1,3- and -1,4-diisocyanate, 1-methyl-2,4- and -2,6-diisocyanatocyclohexane and any mixtures of these isomers (HTDI or $H_6TDI$), 1-isocyanato-3,3,5-trimethyl-5-isocyanatomethyl-cyclohexane (isophoronediisocyanate or IPDI), perhydro-2,4'- and -4,4'-diphenylmethane diisocyanate (HMDI or $H_{12}MDI$), 1,4-diisocyanato-2,2,6-trimethylcyclohexane (TMCDI), 1,3- and 1,4-bis-(isocyanatomethyl)cyclohexane, m- and p-xylylene diisocyanate (m- and p-XDI), m- and p-tetramethyl-1,3- and -1,4-xylylene diisocyanate (m- and p-TMXDI), bis-(1-isocyanato-1-methylethyl)naphthalene, dimer or trimer fatty acid isocyanates, such as 3,6-bis-(9-isocyanatononyl)-4,5-di-(1-heptenyl)cyclohexene (dimeryl diisocyanate), and α,α,α',α',α",α"-hexamethyl-1,3,5-mesitylene triisocyanate. Preferred thereof are HDI, TMDI, IPDI and $H_{12}MDI$.

Aromatic polyisocyanates, particularly 4,4'-diphenylmethane diisocyanate, 2,4'-diphenylmethane diisocyanate and 2,2'-diphenylmethane diisocyanate and any mixtures of these isomers (MDI), 2,4- and 2,6-toluylene diisocyanate and any mixtures of these isomers (TDI), 1,3- and 1,4-phenylene diisocyanate, 2,3,5,6-tetramethyl-1,4-diisocyanatobenzene, naphthalene-1,5-diisocyanate (NDI), 3,3'-dimethyl-4,4'-diisocyanatodiphenyl (TODI, dianisidine diisocyanate (DADI), 1,3,5-tris-(isocyanatomethyl)benzene, tris-(4-isocyanatophenyl)methane and tris-(4-isocyanatophenyl)thiophosphate. Preferred thereof are MDI and TDI. A particularly preferred form of MDI is an MDI iso-mer mixture comprising 4,4'-diphenylmethane diisocyanate and 2,4'-diphenylmethane diisocyanate in about equal amounts, commercially available e.g. as Desmodur® 2424 (from Bayer) or Lupranate® MI (from BASF).

Preferred polyisocyanates to obtain the isocyanate-functional polyurethane polymer are aliphatic polyisocyanates. Such polymers provide membranes with a particularly good shelf life stability and light-fastness, i.e. yellowing resistance under sunlight exposure, as well as good UV-resistance.

The most preferred aliphatic polyisocyanate to obtain the isocyanate-functional polyurethane polymer is IPDI. Such polymers provide particularly low viscous membranes having high strength and high elongation.

In one embodiment of the invention, preferred polyisocyanates to obtain the isocyanate-functional polyurethane polymer are aromatic polyisocyanates, in particular MDI. MDI is preferred from an EHS point of view since it has a very low volatility. Moreover MDI is inexpensive and affords fast curing properties and high strength membranes.

To obtain the isocyanate-functional polyurethane polymer, it can be advantageous to use polyisocyanates containing a certain amount of their oligomers or polymers or other derivatives. Especially in the case of MDI, it can be advantageous to use mixtures of MDI with oligomers or polymers or derivatives of MDI, preferably so-called modified MDI containing carbodiimides or uretonimines or urethanes of MDI, which are commercially available e.g. as Desmodur® CD, Desmodur® PF, Desmodur® PC (all from Bayer) or Isonate® M 143 (from Dow), as well as so-called polymeric MDI or PMDI representing mixtures of MDI with homologues of MDI, such as Desmodur® VL, Desmodur® VL50, Desmodur® VL R10, Desmodur® VL R20, Desmodur® VH 20 N and Desmodur® VKS 20F (all from Bayer), Isonate® M 309, Voranate® M 229 and Voranate® M 580 (all from Dow) or Lupranate® M 10 R (from BASF).

The one-part moisture-curing liquid-applied waterproofing membrane further comprises at least one aldimine of the formula (I).

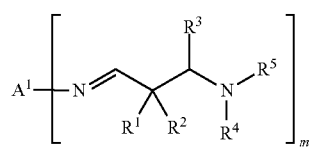

(I)

Preferably $R^1$ and $R^2$ are each methyl. These aldimines provide membranes having low viscosity as well as fast, reliable curing properties.

Preferably $R^3$ is hydrogen. These aldimines provide membranes having low viscosity as well as fast, reliable curing properties.

Preferably $R^4$ and $R^5$ are each a linear or branched $C_1$ to $C_8$ alkyl or cycloalkyl or aralkyl optionally containing ether groups, or are joined together to form a divalent linear or branched $C_4$ to $C_8$ hydrocarbyl moiety which is part of a 5- to 8-membered heterocyclic ring which, besides the nitrogen atom, may contain an ether or thioether or tertiary amino group.

More preferably $R^4$ and $R^5$ are each a methoxyethyl group or are joined together to form, including the nitrogen atom, a morpholine or a 2,6-dimethylmorpholine ring.

Most preferably $R^4$ and $R^5$ form a morpholine ring together with the nitrogen atom.

These aldimines provide membranes with a very good shelf life stability, fast curing properties and high strength.

Preferably m is 2 or 3.

Particularly preferred are aldimines of the formula (I) wherein $R^1$ and $R^2$ are methyl, $R^3$ is hydrogen and $R^4$ and $R^5$ form a morpholine ring together with the nitrogen atom.

In one embodiment of the invention, $A^1$ is a divalent or a trivalent hydrocarbyl moiety of molecular weight in the range of 180 to 5,000 g/mol containing ether groups, preferably a divalent or a trivalent hydrocarbyl moiety of molecular weight in the range of 180 to 2,000 g/mol, particularly 180 to 500 g/mol, containing 1,2-oxypropylene units. These aldimines provide membranes with very fast curing properties.

Most preferably $A^1$ is a trivalent hydrocarbyl moiety of molecular weight in the range of 380 to 5,000 g/mol, particularly 380 to 500 g/mol, containing 1,2-oxypropylene units. These aldimines provide membranes having fast curing properties and a particularly high durability.

In another embodiment of the invention, $A^1$ is a divalent hydrocarbyl moiety of molecular weight in the range of 28 to 400 g/mol, preferably 80 to 250 g/mol. Most preferably $A^1$ is the moiety remaining when removing the primary amino groups of a diamine selected from the group consisting of hexamethylene-1,6-diamine, 2-methylpentane-1,5-diamine, 3-aminomethyl-3,5,5-trimethylcyclohexylamine (isophoronediamine), 2,2,4- and 2,4,4-trimethylhexamethylenedi-amine, 1,3-bis(aminomethyl)benzene, 1,3-bis(aminomethyl)cyclohexane, 1,4-bis(aminomethyl)cyclohexane, bis(4-aminocyclohexyl)methane, bis(4-amino-3-methylcyclohexyl)methane, 2,5(2,6)-bis-(aminomethyl)bicyclo[2.2.1]heptane, 3(4),8(9)-bis(aminomethyl)-tricyclo[5.2.1.0$^{2,6}$]decane, 1,2-diaminocyclohexane, 1,3-diaminocyclohexane, 1,4-diaminocyclohexane, 2,2,6-trimethylcyclohexane-1,4-diamine, 3,6-dioxaoctane-1,8-diamine, 4,7-dioxadecane-1,10-diamine and 4-aminomethyl-1,8-octanediamine.

These aldimines provide membranes with a particularly high strength.

Particularly preferred aldimines of the formula (I) are selected from the group consisting of N,N'-bis(2,2-dimethyl-3-(N-morpholino)-propylidene)-hexamethylene-1,6-diamine, N,N'-bis(2,2-dimethyl-3-(N-morpholino)-propylidene)-3-aminomethyl-3,5,5-trimethylcyclohexylamine, N,N'-bis(2,2-dimethyl-3-(N-morpholino)-propylidene)-polyoxypropylene diamine with an average molecular weight in the range of 500 to 4'400 g/mol and N,N',N'''-tris(2,2-dimethyl-3-(N-morpholino)-propylidene)-polyoxypropylene triamine with an average molecular weight in the range of 860 to 5'500 g/mol.

The one-part moisture-curing liquid-applied waterproofing membrane further comprises at least one aldimine of the formula (II).

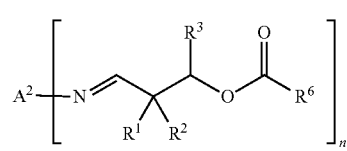

(II)

$R^1$, $R^2$ and $R^3$ have the already mentioned meanings.

Preferably $R^6$ is $C_{11}$ alkyl. These aldimines provide odourless membranes having low viscosity and high flexibility at low temperatures.

Particularly preferred are aldimines of the formula (I) wherein $R^1$ and $R^2$ are methyl, $R^3$ is hydrogen and $R^6$ is $C_{11}$ alkyl.

Preferably n is 2 or 3.

In one embodiment of the invention, $A^2$ is a divalent or a trivalent hydrocarbyl moiety of molecular weight in the range of 180 to 5,000 g/mol containing ether groups, preferably a divalent or a trivalent hydrocarbyl moiety of molecular weight in the range of 180 to 2,000 g/mol, particularly 180 to 500 g/mol, containing 1,2-oxypropylene units. These aldimines provide membranes with very fast curing properties.

Most preferably $A^2$ is a trivalent hydrocarbyl moiety of molecular weight in the range of 380 to 5,000 g/mol, particularly 380 to 500 g/mol, containing 1,2-oxypropylene units. These aldimines provide membranes having fast curing properties and a particularly high durability.

In another embodiment of the invention, $A^2$ is a divalent hydrocarbyl moiety of molecular weight in the range of 28 to 400 g/mol, preferably 80 to 250 g/mol. Most preferably $A^2$ is the moiety remaining when removing the primary amino groups of a diamine selected from the group consisting of hexamethylene-1,6-diamine, 2-methylpentane-1,5-diamine, 3-aminomethyl-3,5,5-trimethylcyclohexylamine (isophoronediamine), 2,2,4- and 2,4,4-trimethylhexamethylenedi-amine, 1,3-bis(aminomethyl)benzene, 1,3-bis(aminomethyl)cyclohexane, 1,4-bis(aminomethyl)cyclohexane, bis(4-aminocyclohexyl)methane, bis(4-amino-3-methylcyclohexyl)methane, 2,5(2,6)-bis-(aminomethyl)bicyclo[2.2.1]heptane, 3(4),8(9)-bis(aminomethyl)-tricyclo[5.2.1.0$^{2,6}$]decane, 1,2-diaminocyclohexane, 1,3-diaminocyclohexane, 1,4-diaminocyclohexane, 2,2,6-trimethylcyclohexane-1,4-diamine, 3,6-dioxaoctane-1,8-diamine, 4,7-dioxadecane-1,10-diamine, 4-aminomethyl-1,8-octanediamine, 1,3-phenylene diamine, 1,4-phenylene diamine, 2,4- and 2,6-toluylene diamine and 4,4'-, 2,4'- and 2,2'-diaminodiphenylmethane.

These aldimines provide membranes with a particularly high strength.

Particularly preferred aldimines of the formula (II) are selected from the group consisting of N,N'-bis(2,2-dimethyl-3-lauroyloxypropylidene)-hexamethylene-1,6-diamine, N,N'-bis(2,2-dimethyl-3-lauroyloxypropylidene)-3-aminomethyl-3,5,5-trimethylcyclohexylamine, N,N'-bis(2,2-dimethyl-3-lauroyloxypropylidene)-polyoxypropylene diamine with an average molecular weight in the range of 700 to 4,600 g/mol and N,N',N''-tris(2,2-dimethyl-3-lauroyloxypropylidene)-polyoxypropylene triamine with an average molecular weight in the range of 1200 to 5,800 g/mol.

The aldimines of the formula (I) are preferably available from a condensation reaction of at least one amine of the formula (III a) and at least one aldehyde of the formula (IV).

The aldimines of the formula (II) are preferably available from a condensation reaction of at least one amine of the formula (III b) and at least one aldehyde of the formula (V).

$$A^1 + NH_2]_m \quad \text{(IIIa)}$$

$$A^2 + NH_2]_n \quad \text{(IIIb)}$$

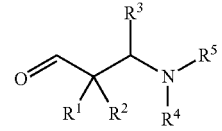

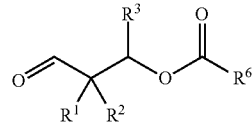

In the formulae (III a), (III b), (IV) and (V), $A^1$, $A^2$, m, n, $R^1$, $R^2$, $R^3$, $R^4$, $R^5$ and $R^6$ have the already mentioned meanings.

For this condensation reaction, the aldehyde of the formula (IV) or of the formula (V) is used stoichiometrically or in excess related to the primary amino groups of the amine of the formula (III a) or of the amine of the formula (III b). The reaction can advantageously be conducted at a temperature in the range between 15 and 120° C., either in the presence of a solvent or without a solvent. The released water is being removed either azeotropically with a suitable solvent, or directly under vacuum.

Particularly suitable amines of the formula (III a) and/or the formula (III b) are hexamethylene-1,6-diamine, 2-methylpentane-1,5-diamine, 3-aminomethyl-3,5,5-trimethylcyclohexylamine (isophoronediamine), 2,2,4- and 2,4,4-trimethyl-hexamethylenediamine, 1,3-bis(aminomethyl)benzene, 1,3-bis(aminomethyl)-cyclohexane, 1,4-bis(aminomethyl)cyclohexane, bis(4-aminocyclohexyl)methane, bis(4-amino-3-methylcyclohexyl)methane, 2,5(2,6)-bis-(aminomethyl)-bicyclo[2.2.1]heptane, 3(4),8(9)-bis(aminomethyl)-tricyclo[5.2.1.0$^{2,6}$]decane, 1,2-, 1,3- and 1,4-diaminocyclohexane, 2,2,6-trimethylcyclohexane-1,4-diamine, 3,6-dioxaoctane-1,8-diamine, 4,7-dioxadecane-1,10-diamine, 4-aminomethyl-1,8-octanediamine, polyoxyalkylene diamines and triamines with an average molecular weight in the range of 200 to 5,000 g/mol, commercially available from Huntsman, BASF and Nitroil, such as Jeffamine® D-230, Jeffamine® D-400, Jeffamine® D-2000, Jeffamine® D-4000, Jeffamine® T-403, and Jeffamine® T-5000, particularly Jeffamine® D-230 and Jeffamine® T-403, as well as the corresponding grades from BASF or Nitroil, further 1,3-phenylene diamine, 1,4-phenylene diamine, 2,4- and 2,6-toluylene diamine and 4,4'-, 2,4'- and 2,2'-diaminodiphenylmethane.

The liquid-applied membrane comprises the aldimine of the formula (I) and the aldimine of the formula (II) in a specific ratio, such that the ratio between the number of the aldimino groups of the aldimine of the formula (I) and the number of the aldimino groups of the aldimine of the formula (II) is in the range of 90/10 to 50/50. In this ratio range, the membrane features a very low viscosity at low solvent content and high strength at high elongation. Outside of the claimed ratio range the membrane is either considerably higher in viscosity or lower in tensile strength.

Preferably one of the two aldimines of formulae (I) and (II) contained in the membrane is derived from a di- or triamine containing ether groups, while the other aldimine is derived from a di- or triamine containing no ether groups. Such membranes have particularly fast curing properties and high strength at high elongation.

More preferably, one of the two aldimines of formulae (I) and (II) contained in the membrane is derived from a polyoxyalkylene di- or triamine, while the other aldimine is derived from a di- or triamine containing no ether groups.

Most preferably, one of the two aldimines of formulae (I) and (II) contained in the membrane is derived from a polyoxyalkylene triamine, in particular a polyoxypropylene triamine, while the other aldimine is derived from a diamine containing no ether groups, in particular an aliphatic or cycloaliphatic diamine. Such membranes have very fast curing properties, high strength at high elongation and particularly high durability.

In a preferred embodiment of the invention, the liquid-applied membrane comprises
- at least one aldimine of the formula (I) wherein $A^1$ is a divalent or a trivalent hydrocarbyl moiety of molecular weight in the range of 180 to 5,000 g/mol containing ether groups; and
- at least one aldimine of the formula (II) wherein $A^2$ is a divalent hydrocarbyl moiety of molecular weight in the range of 28 to 400 g/mol.

Such a liquid-applied membrane preferably contains
- at least one aldimine of the formula (I) selected from the group consisting of N,N'-bis(2,2-dimethyl-3-(N-morpholino)-propylidene)-polyoxypropylene diamine with an average molecular weight in the range of 500 to 4'400 g/mol and N,N',N"-tris(2,2-dimethyl-3-(N-morpholino)-propylidene)-polyoxypropylene triamine with an average molecular weight in the range of 860 to 5'500 g/mol; and
- at least one aldimine of the formula (II) selected from the group consisting of N,N'-bis(2,2-dimethyl-3-lauroyloxypropylidene)-hexamethylene-1,6-diamine and N,N'-bis(2,2-dimethyl-3-lauroyloxypropylidene)-3-aminomethyl-3,5,5-trimethylcyclohexylamine.

In another preferred embodiment of the invention, the liquid-applied membrane comprises
- at least one aldimine of the formula (I) wherein $A^1$ is a divalent hydrocarbyl moiety of molecular weight in the range of 28 to 400 g/mol; and
- at least one aldimine of the formula (II) wherein $A^2$ is a divalent or a trivalent hydrocarbyl moiety of molecular weight in the range of 180 to 5,000 g/mol containing ether groups.

Such a liquid-applied membrane preferably contains
- at least one aldimine of the formula (I) selected from the group consisting of N,N'-bis(2,2-dimethyl-3-(N-morpholino)-propylidene)-hexamethylene-1,6-diamine and N,N'-bis(2,2-dimethyl-3-(N-morpholino)-propylidene)-3-aminomethyl-3,5,5-trimethylcyclohexylamine; and
- at least one aldimine of the formula (II) selected from the group consisting of N,N'-bis(2,2-dimethyl-3-lauroyloxypropylidene)-polyoxypropylene diamine with an average molecular weight in the range of 700 to 4,600 g/mol and N,N',N"-tris(2,2-dimethyl-3-lauroyloxypropylidene)-polyoxypropylene triamine with an average molecular weight in the range of 1200 to 5,800 g/mol.

Preferably the total aldimine content in the liquid-applied membrane is such that the ratio between the total number of aldimino groups to the number of isocyanate groups is in the range of 0.3 to 1.0, preferably 0.4 to 0.9, more preferably 0.6 to 0.8. In this range, the membrane cures quickly without the formation of bubbles or blisters to a flexible material of high strength.

Preferably the content of the isocyanate-functional polyurethane polymer in the liquid-applied membrane is in the range of 15 to 70 weight-%, more preferably 15 to 60 weight-%, particularly 15 to 50 weight-%. This enables membranes with good durability and good mechanical properties.

Besides the ingredients already mentioned, the liquid-applied membrane may comprise further ingredients.

Preferably the liquid-applied membrane comprises at least one filler. Fillers help to develop strength and durability.

Preferred fillers are inorganic fillers, particularly calcium carbonate ("chalk"), such as ground calcium carbonate (GCC) and precipitated calcium carbonate (PCC), barium sulfate (barytes), slate, silicates (quartz), magnesiosilicates (talc), alumosilicates (clay, kaolin), dolomite, mica, glass bubbles and silicic acid, in particular highly dispersed silicic acids from pyrolytic processes (fumed silica). These fillers may or may not carry a surface coating, e.g. a stearate or siloxane coating.

Further preferred fillers are organic fillers, particularly carbon black and micro-spheres.

Preferably the liquid-applied membrane further comprises at least one pigment. The pigment defines the colour of the membrane, helps to develop strength and increases durability, particularly UV-stability.

Preferred pigments are titanium dioxide, iron oxides and carbon black.

Preferably the liquid-applied membrane further comprises at least one flame-retarding filler. Preferred flame-retarding fillers are aluminum trihydroxide (ATH), magnesium dihydroxide, antimony trioxide, antimony pentoxide, boric acid, zinc borate, zinc phosphate, melamine borate, melamine cyanurate, ethylenediamine phosphate, ammonium polyphosphate, di-melamine ortho-phosphate, di-melamine pyrophosphate, hexabromocyclododecane, deca-bromodiphenyl oxide and tris(bromoneopentyl) phosphate.

Preferably the liquid-applied membrane further comprises at least one flame-retarding plasticizer, particularly a phosphate or a phosphonate, particularly triphenyl phosphate (TPP), diphenyl-tert.butylphenyl phosphate, diphenylcresyl phosphate (DPK), tricresyl phosphate (TKP), triethyl phosphate, tris(2-ethylhexyl) phosphate, diphenyl-2-ethylhexyl phosphate (DPO), tris(2-ethylhexyl) phosphate (TOF), diphenylisodecyl phosphate, dimethyl propane phosphonate (DMPP), tetraphenyl resorcinol diphosphate, resorcinol diphosphate oligomer (RDP), ethylenediamine diphosphate, as well as chloroalkyl phosphate esters such as tris(1-chloro-2-propyl) phosphate, tris(1,3-dichloro-2-propyl) phosphate and 2,2-bis(chloromethyl)trimethylene bis(bis(2-chloroethyl)phosphate).

Preferably the liquid-applied membrane further comprises at least one polyisocyanate crosslinker with an NCO-functionality of greater than two, particularly oligomers, polymers or derivatives of the already mentioned diisocyanates. Preferred aliphatic polyisocyanate crosslinkers are HDI-biurets, such as Desmodur® N 100 and N 3200 (from Bayer), Tolonate® HDB and HDB-LV (from Rhodia) and Duranate® 24A-100 (from Asahi Kasei); HDI-isocyanurates, such as Desmodur® N 3300, N 3600 and N 3790 BA (from Bayer), Tolonate® HDT, HDT-LV and HDT-LV2 (from Rhodia), Duranate® TPA-100 and THA-100 (from Asahi Kasei) and Coronate® HX (from Nippon Polyurethane); HDI-uretdiones, such as Desmodur® N 3400 (from Bayer); HDI-iminooxadiazinediones, such as Desmodur® 3900 (from Bayer); HDI-allophanates, such as Desmodur® VP LS 2102 (from Bayer) and Basonat® HA 100, Basonat® HA 200 and Basonat® HA 300 (all from BASF); IPDI-isocyanurates, such as Desmodur® Z 4470 (from Bayer) and Vestanat® T1890/100 (from Evonik); mixed isocyanurates based on IPDI/HDI, such as Desmodur® NZ 1 (from Bayer). Preferred aromatic polyisocyanate crosslinkers are TDI-oligomers, such as Desmodur® IL (from Bayer); modified MDI containing carbodiimides or uretonimines of MDI, such as the already mentioned ones. Mixed aromatic/aliphatic polyisocyanate crosslinkers may also be used, in particular isocyanurates based on TDI/HDI, such as Desmodur® HL (from Bayer).

Aliphatic polyisocyanate crosslinkers are particularly preferred in membranes containing isocyanate-functional polyurethane polymers based on aliphatic polyisocyanates.

Particularly preferred are IPDI-isocyanurates and mixed isocyanurates containing IPDI.

Preferably the liquid-applied membrane further comprises at least one metal-based catalyst accelerating the reaction of the isocyanate groups. Preferred metal-based catalysts are dialkyltin complexes, particularly dimethyltin, dibutyltin or dioctyltin carboxylates, mercaptides or acetoacetonates, such as DMTDL, DBTDL, DBT(acac)$_2$, DOTDL, dioctyltin (IV)neodecanoate or DOT(acac)$_2$, bismuth(III) complexes, such as bismuth(III)octoate or bismuth-(III)neodecanoate, zinc(II) complexes, such as zinc(II)octoate or zinc(II)neodecanoate, and zirconium(IV) complexes, such as zirconium (IV)octoate or zirconium (IV)neodecanoate.

Preferably the liquid-applied membrane further comprises at least one acid catalyst accelerating the hydrolysis of the aldimino groups. Preferred acid catalysts are carboxylic acids and sulfonic acids, particularly aromatic carboxylic acids, such as benzoic acid or salicylic acid.

Preferably the liquid-applied membrane further comprises at least one UV-stabilizer. Preferred UV-stabilizers are UV-absorbers, such as benzophenones, benzotriazoles, oxalanilides, phenyltriazines and particularly 2-cyano-3,3-diphenylacrylic acid ethyl ester, and hindered amine light stabilizers (HALS), such as bis(1,2,2,6,6-pentamethyl-4-piperidyl) sebacate and other compounds containing at least one 1,2,2,6,6-pentamethyl-4-piperidinyl moiety. UV-stabilizers help to prevent the polymer from degradation under light exposure.

The liquid-applied membrane may further comprise the following ingredients:
other polyisocyanates, such as other isocyanate-functional polyurethane polymers, particularly those based on MDI, TDI, IPDI or HDI;
blocked amine hardeners other than the mentioned aldimines, particularly other aldimines;
plasticizers other than phosphates and phosphonates, particularly phthalates, trimellitates, succinates, glutarates, adipates, sebacates, azelates, citrates, benzoates, acetylated glycerin or monoglycerides, hydrogenated phthalates, fatty acid esters, arylsulfonates or hydrocarbon resins;
organic solvents, such as hydrocarbons, esters or ethers, particularly acetyl acetone, mesityloxide, cyclohexanone, methylcyclohexanone, ethyl acetate, propyl acetate, 1-methoxy-2-propylacetate, butyl acetate, diethyl malonate, diisopropylether, diethylether, dibutylether, ethylene glycol diethylether, diethylene glycol diethylether, toluene, xylenes, heptanes, octanes, diisopro-pylnaphthalenes and petroleum fractions, such as naphtha, white spirits and petroleum ethers, such as Solvesso™ solvents (from Exxon), hydrogenated aromatic solvents such as hydrogenated naphtha, methylene chloride, propylene carbonate, butyrolactone, N-methyl-pyrrolidone and N-ethyl-pyrrolidone;
additives, such as wetting agents, flow enhancers, levelling agents, defoamers, deaerating agents, drying agents, antioxidants, adhesion promoters, rheology modifiers, particularly fumed silica, and biocides.

When using such further ingredients it is advantageous to ensure that they do not strongly impair the shelf life stability of the uncured membrane, i.e., do not massively trigger reactions leading to crosslinking of the polymer during storage. In particular these further ingredients should not contain any water above trace quantities. It can be advantageous to dry ingredients physically or chemically before use.

Preferably the liquid-applied membrane comprises
at least one ingredient selected from the group consisting of inorganic fillers and pigments,
at least one ingredient selected from the group consisting of flame-retarding plasticizers and flame-retarding fillers, and
at least one ingredient selected from the group consisting of catalysts, plasticizers, solvents and UV-stabilizers.

These further ingredients provide membranes with good shelf life stability, good workability, fast curing properties as well as high strength and durability, which have a low tendency to develop flames and smoke in case of fire. Such membranes are highly suitable for applications on a roof.

Preferably the liquid-applied membrane has a filler content in the range of 20 to 80 weight-%, more preferably in the range of 30 to 60 weight-%, the filler including inorganic, organic and flame-retarding fillers and pigments. At this filler content the membrane provides high strength and durability.

A particularly preferred liquid-applied membrane contains
from 15 to 70 weight-% isocyanate-functional polyurethane polymers;
from 20 to 80 weight-% fillers including inorganic fillers, flame-retarding fillers and pigments;
from 5 to 30 weight-%, preferably from 5 to 20 weight-%, plasticizers including flame-retarding plasticizers;
and comprises at least one further ingredient selected from the group consisting of catalysts, solvents and UV-stabilizers.

Preferably, it comprises at least one flame-retarding ingredient selected from the group consisting of flame-retarding fillers and flame-retarding plasticizers. Such a membrane has good shelf life stability, good workability at low solvent content, good mechanical properties and durability and a low tendency to develop flames and smoke in case of fire.

Preferably the liquid-applied membrane has a low viscosity. This enables a good workability when applied as a self-levelling coating. Particularly the membrane has a Brookfield viscosity in the range of 2,000 to 15,000 mPa·s at 20° C., preferably in the range of 2,000 to 10,000 mPa·s at 20° C. In this viscosity range the membrane is self-levelling enough to allow easy application on flat or low slope roof surfaces but does not flow away into small cavities on the substrate surface.

Preferably the liquid-applied membrane has a low solvent content; most preferably it contains 50 g VOC per liter or less. At such low solvent content the membrane fulfills toughest VOC specifications, e.g. those of the South Coast Air Quality Management District.

State-of-the-art one-part moisture-curing liquid-applied waterproofing membranes based on isocyanate-functional polyurethane polymers and blocked amine hardeners are difficult to formulate at low solvent content. Especially low viscosity and sufficient shelf life stability is difficult to achieve without the use of high amounts of solvents. In this invention it was surprisingly found that the use of an aldimine of the formula (II) is an effective method to reduce the viscosity of the membrane without or with only minimal reducing the strength of the membrane.

A further subject of the invention is the use of at least one aldimine of the formula (II) as a diluent in a one-part moisture-curing liquid-applied waterproofing membrane comprising at least one isocyanate-functional polyurethane polymer and at least one aldimine of the formula (I).

Preferably the aldimine of the formula (II) is used in an amount corresponding to a ratio between the number of the aldimino groups of the aldimine of the formula (I) and the number of the aldimino groups of the aldimine of the formula (II) in the range of 90/10 to 50/50.

This use provides liquid-applied membranes having a particularly low viscosity at low solvent content, good shelf life stability, fast curing properties, as well as high strength and high elongation after curing.

The one-part moisture-curing liquid-applied waterproofing membrane may be prepared by mixing all ingredients under exclusion of moisture to obtain a homogeneous fluid. It may be stored in a suitable moisture-tight container, particularly a bucket, a drum, a hobbock, a bag, a sausage, a cartridge, a can or a bottle.

The membrane is applied in liquid state within its open time, typically by pouring it onto the substrate, followed by spreading it, e.g. with a roller or a squeegee, to get the desired layer thickness, which is typically in the range of 0.5 to 3 mm, particularly 0.75 to 1.5 mm.

"Open time" means hereby the period of time between the exposure to moisture and the formation of a skin on the surface of the membrane, also called "tack-free time" or "skinning time".

The liquid-applied membrane is self-levelling, which means its viscosity is low enough to develop an even surface after being spread by rolling or brushing. The curing of the membrane starts when it gets in contact with moisture, typically atmospheric moisture. The curing process works by chemical reaction. The aldimino groups are activated with moisture and then react with isocyanate groups. On activation, each aldimino group forms a primary amino group. Furthermore, the isocyanate groups can also react directly with moisture. As a re-suit of these reactions, the membrane cures to a solid, elastic material. The curing process may also be called crosslinking. After curing, an elastic material with a very good adhesion to a large number of substrates is obtained.

In the course of the curing reaction, the blocking agents of the aldimines, which are aideyhdes of the formula (IV) and (V), are released. These blocking agents, depending on their volatility and other factors such as their solubility in the membrane, may evaporate from the membrane during or after curing, or may remain in the cured membrane. The aldehydes of the formula (IV) are of low odour and of good compatibility with the polyurethane matrix of the membrane. Particularly the preferred 2,2-dimethyl-3-(N-morpholino)propanal has an excel-lent compatibility with the polyurethane matrix. The aldehydes of the formula (V) are of low odour or odourless. Particularly the preferred 2,2-dimethyl-3-lauroyloxypropanal is odourless and remains almost completely in the membrane, reducing odour, emission and shrinkage of the membrane.

The membrane can be applied onto various substrates, forming an elastic coating on the substrate. It can be used particularly for waterproofing a roof, a roof deck or a roof garden, as well as a planter, a balcony, a terrace, a plaza, or a foundation. It can also be used indoors for waterproofing, particularly under ceramic tiles, e.g. in a bath room, a catering kitchen or a plant room, protecting them from water ingress. The liquid-applied membrane is particularly suitable for refurbishment purposes.

Most preferred is the use of the liquid-applied membrane on a roof, particularly a flat or low slope roof. It can be used to waterproof a new roof as well as for refurbishment purposes and is particularly useful for detailing work.

The liquid-applied membrane is preferably used as part of a waterproofing system, consisting of
optionally a primer and/or an undercoat,
one or more than one layers of the membrane, preferably in combination with a fibre reinforcement mesh, and
optionally a top coat.

The liquid-applied membrane is preferably used by being poured onto a substrate, being spread evenly within its open time to the desired layer thickness, typically in the range of 0.5 to 3 mm, particularly in the range of 0.75 to 1.5 mm, by a roller, a brush, a spreading knife or a wiper.

Preferably the fibre reinforcement mesh is applied after the first layer of the membrane, by placing it on top of the freshly applied membrane and then rolling or working it thoroughly into the membrane within the open time of the membrane, particularly by means of a roller or a brush. The membrane with the incorporated fibre reinforcement mesh is then cured at least to the point that it is walkable, before an optional next layer of the membrane is applied.

It can be advantageous to apply a top coat onto the top layer of the membrane, such as a covering lacquer or the like. Especially for membranes based on aromatic isocyanates, it is advantageous to apply an UV-resistant top coat onto the cured membrane.

Another subject of the invention is a method of waterproofing a roof structure, comprising
applying the membrane in liquid state onto a substrate of the roof structure in a layer thickness in the range of 0.5 to 3 mm, particularly in the range of 0.75 to 1.5 mm;
contacting the membrane with a fibre reinforcement mesh within the open time of the membrane;
exposing the membrane to moisture to thereby cure the membrane partially or fully to obtain an elastic coating;
optionally applying a second layer of the membrane in a layer thickness in the range of 0.5 to 3 mm, particularly in the range of 0.75 to 1.5 mm, and curing it by exposure to moisture.

The fibre reinforcement mesh is preferably a non-woven polyester fibre mesh and more preferably a non-woven glass fibre mesh.

The fibre reinforcement mesh acts as a reinforcement for the membrane, providing increased strength and durability. The randomly orientated fibres in the preferred non-woven fibre meshes give a multidirectional strength to the membrane while allowing it to remain highly elastic. It improves strength, tear resistance and puncture resistance. The non-woven glass fibre mesh shows a particularly easy handling, as it is not stiff, but easily adapts to the given surface topography.

Substrates onto which the membrane can be applied are particularly
concrete, lightweight concrete, mortar, brick, adobe, tile, slate, gypsum and natural stone, such as granite or marble;
metals and alloys, such as aluminium, copper, iron, steel, nonferrous metals, including surface-finished metals and alloys, such as galvanized metals and chrome-plated metals;
asphalt;
bituminous felt;

plastics, such as PVC, ABS, PC, PA, polyester, PMMA, SAN, epoxide resins, phenolic resins, PUR, POM, PO, PE, PP, EPM, EPDM in untreated form or surface treated by means of plasma, corona or flame; particularly PVC, PO (FPO, TPO) or EPDM membranes; coated substrates, such as varnished tiles, painted concrete and coated metals.

It can be advantageous to pre-treat the substrate before applying the membrane, for example by washing, pressure-washing, wiping, blowing off, grinding and/or applying a primer and/or an undercoat.

By this method, a waterproof roof structure is obtained comprising the cured membrane with the incorporated fibre reinforcement mesh.

The roof structure is preferably part of the roof of a building, particularly a building from structural and civil engineering, preferably a house, an industrial building, a hangar, a shopping center, a sports stadium or the like.

The one-part moisture-curing liquid-applied waterproofing membrane described herein has a series of advantages. It has a very good shelf life stability and a particularly low viscosity, even at very low VOC content. It is of low odour, both before, during and after application. It has a sufficiently long open time to allow hand application together with fast curing properties. In cured state, it shows high strength, high elongation, high durability and good adhesion to various substrates, which enables the membrane to protect particularly the roof of a building from water ingress at outdoor weathering conditions.

EXAMPLES

"Normal climate" means a temperature of 23±1° C. and a relative atmospheric moisture of 50±5%.

The amine content (total content of free amines and blocked amines, i.e. aldimino groups) of the prepared aldimines was determined by titration (with 0.1 N $HClO_4$ in acetic acid against cristal violet) and is given in mmol N/g.

1. Used Substances:

| | |
|---|---|
| IPDI trimer | Isocyanurate of IPDI, 70 weight-% in solventnaphtha 100, NCO-content 11.9 wt-% (Desmodur ® Z 4470 SN from Bayer) |
| Aldimine-A1 | N,N',N"-tris(2,2-dimethyl-3-(N-morpholino)-propylidene)-polyoxypropylene triamine with an average molecular weight of about 900 g/mol; with an equivalent weight of about 320 g/Eq (derived from Jeffamine ® T-403 from Huntsman). |
| Aldimine-A2 | N,N'-bis(2,2-dimethyl-3-(N-morpholino)-propylidene)-3-amino-methyl-3,5,5-trimethylcyclohexylamine; with an equivalent weight of about 247 g/Eq. |
| Aldimine-A3 | N,N'-bis(2,2-dimethyl-3-(N-morpholino)-propylidene)-hexamethylene-1,6-diamine; with an equivalent weight of about 219 g/Eq. |
| Aldimine-B1 | N,N',N"-tris(2,2-dimethyl-3-lauroyloxypropylidene)-propylidene)-polyoxypropylene triamine with an average molecular weight of about 1240 g/mol; with an equivalent weight of about 449 g/Eq (derived from Jeffamine ® T-403 from Huntsman). |
| Aldimine-B2 | N,N'-bis(2,2-dimethyl-3-lauroyloxypropylidene)-3-aminomethyl-3,5,5-trimethylcyclohexylamine; with an equivalent weight of about 367 g/Eq. |
| ATH | aluminum trihydroxide |
| DBTDL | Dibutyltin dilaurate (Sigma Aldrich) |
| HALS | Bis-(1,2,2,6,6-pentamethyl-4-piperidyl)-sebacate |
| DPK | Diphenylcresyl phosphate (Disflamoll ® DPK from Lanxess) |

The Polymer-1 was prepared by reacting 906.1 g polyoxypropylene diol with an average molecular weight of ca. 1000 g/mol (Voranol® 1010 L from Dow), 28.1 g 1,4-butanediol and 514.4 g isophoronediisocyanate (Vestanat® IPDI from Evonik) in the presence of 1.4 g dibutyltin dilaurate (DBTDL) according to known procedures at 80° C. to obtain an isocyanate-functional polyurethane polymer with an NCO content of 6.34 weight-%.

Aldimine-A1: N,N',N"-tris(2,2-dimethyl-3-(N-morpholino)-propylidene)-polyoxypropylenetriamine 514 g (3.0 mol) 2,2-dimethyl-3-(N-morpholino)-propanal were placed in a round bottom flask under nitrogen atmosphere. Then 440 g (ca. 2.8 mol N) polyoxypropylenetriamine of average molecular weight of about 440 g/mol (Jeffamine® T-403 from Huntsman, amine content 6.40 mmol N/g) were added under good stirring, followed by removing the volatile contents at 80° C. and 10 mbar vacuum. The yield was 902 g of a nearly colourless liquid with an amine content of 6.44 mmol N/g, corresponding to a calculated aldimine equivalent weight of approx. 320 g/Eq.

Aldimine-A2: N,N'-bis(2,2-dimethyl-3-(N-morpholino)-propylidene)-3-aminomethyl-3,5,5-trimethylcyclohexylamine Under the same conditions as given for Aldimine-A1, 359.5 g (2.1 mol) 2,2-dimethyl-3-(N-morpholino)-propanal and 170.3 g (1 mol) 3-aminomethyl-3,5,5-trimethylcyclohexylamine (Vestamin® IPD from Evonik) were reacted. The yield was 493.2 g of a nearly colourless liquid with an amine content of 8.25 mmol N/g, corresponding to a calculated aldimine equivalent weight of approx. 247 g/Eq.

Aldimine-A3: N,N'-bis(2,2-dimethyl-3-(N-morpholino)-propylidene)-hexamethylene-1,6-diamine Under the same conditions as given for Aldimine-A1, 359.5 g (2.1 mol) 2,2-dimethyl-3-(N-morpholino)-propanal and 166.0 g (1 mol) hexamethylene-1,6-diamine solution (70 weight-% in water) were reacted. The yield was 439.1 g of a nearly colourless liquid with an amine content of 9.27 mmol N/g, corresponding to a calculated aldimine equivalent weight of approx. 219 g/Eq.

Aldimine-B1: N,N',N"-tris(2,2-dimethyl-3-lauroyloxypropylidene)-polyoxypropylenetriamine Under the same conditions as given for Aldimine-A1, 875 g (3.08 mol) 2,2-dimethyl-3-lauroyloxy-propanal and 440 g (ca. 2.8 mol N) polyoxypropylenetriamine of average molecular weight of about 440 g/mol (Jeffamine® T-403 from Huntsman, amine content 6.40 mmol N/g) were reacted. The yield was 1,264 g of a nearly colourless liquid with an amine content of 2.23 mmol N/g, corresponding to a calculated aldimine equivalent weight of approx. 449 g/Eq.

Aldimine-B2: N,N'-bis(2,2-dimethyl-3-lauroyloxypropylidene)-3-aminomethyl-3,5,5-trimethylcyclohexylamin Under the same conditions as given for Aldimine-A1, 598 g (2.1 mol) 2,2-dimethyl-3-lauroyloxy-propanal and 170.3 g (1 mol) 3-aminomethyl-3,5,5-trimethylcyclohexylamine (Vestamin® IPD from Evonik) were reacted. The yield was 732 g of a nearly colourless liquid with an amine content of 2.73 mmol N/g, corresponding to a calculated aldimine equivalent weight of approx. 367 g/Eq.

2. One-Part Moisture-Curing Liquid-Applied Membranes

For each membrane the following ingredients were mixed under exclusion of moisture in a sealed polypropylene beaker by means of a centrifugal mixer (SpeedMixer™ DAC 150, FlackTek Inc.) until a homogeneous fluid was obtained:
554.7 weight parts of the Polymer-1,
71.5 weight parts of IPDI trimer,
278.9 weight parts of titanium dioxide,
545.3 weight parts of ATH,
213.1 weight parts of barytes,
18.4 weight parts of fumed silica,
26.9 weight parts of carbon black,
10.0 weight parts of HALS,
0.2 weight parts of DBTDL,
0.8 weight parts of salicylic acid and
the ingredients given in Table 1 or Table 2.

The membranes were stored in a tightly sealed, moisture-proof can for 24 hours at ambient temperature and then tested as follows:

The viscosity was measured with a Brookfield DV-E spindle type viscometer, spindle n° 5, 30 rpm, at a temperature of 20° C. "Initial" means the viscosity measured 24 hours after mixing of the ingredients. "28d 40° C." means the viscosity measured after an additional storage of 28 days at 40° C.

To determine the tack-free time (time until a tack-free skin has developed on the applied membrane) a small portion of the membrane was applied at a climate of 20° C./45% in a layer of 2 mm on cardboard and touched slightly with an LDPE pipette until the membrane stopped to leave a residue on the surface of the pipette.

To determine the mechanical properties, a two-layer cured film was prepared for each membrane. To prepare the film, a first layer of 800 µm thickness was applied with a draw down bar and left curing in normal climate (NC) for 24 hours; then a second layer of 400 µm thickness was applied thereon at an angle of 90° and again left curing in NC for 24 hours; the two-layer film was then placed it an oven at 60° C. for 24 hours. After an additional 24 hours in NC, dumbbells with a length of 75 mm, a crosspiece length of 30 mm and a crosspiece width of 4 mm were punched from the film and tensile strength and elongation at break determined according to DIN EN 53504 at a cross-head speed of 200 mm/min.

All the membranes formed flexible films without bubbles and without tack.

The results are given in Table 1 and Table 2.

The liquid-applied membranes Ex-1 to Ex-9 are examples according to the invention, the liquid-applied membranes Ref-1 to Ref-6 are comparative examples.

TABLE 1

Composition (in weight parts) and test results of the examples Ref-1 to Ref-6 and Ex-1.

|  | Ref-1 | Ref-2 | Ref-3 | Ref-4 | Ref-5 | Ref-6 | Ex-1 |
|---|---|---|---|---|---|---|---|
| Ingredients Given Above | 1719.8 | 1719.8 | 1719.8 | 1719.8 | 1719.8 | 1719.8 | 1719.8 |
| Solvent[1] | 58.6 | 58.6 | 8.0 | 8.0 | 8.0 | 8.0 | 8.0 |
| DPK | 405.0 | 529.2 | 579.8 | 579.8 | 579.8 | 579.8 | 579.8 |
| Aldimine-A1 | — | 266.3 | 190.7 | — | 93.3 | — | 160.0 |
| Aldimine-A2 | — | 32.9 | 32.9 | — | — | 32.9 | — |
| Aldimine-B1 | 356.1 | — | — | 267.2 | — | 267.2 | — |
| Aldimine-B2 | 63.6 | — | — | 48.9 | 160.4 | — | 48.9 |
| NH$_2$/NCO | 0.93 | 0.93 | 0.70 | 0.70 | 0.70 | 0.70 | 0.61 |
| Eq Ald. (I)/Eq Ald. (II)[2] | 0/100 | 100/0 | 100/0 | 0/100 | 40/60 | 18/82 | 79/21 |
| VOC Content [g/l] | 45.7 | 46.9 | 19.8 | 18.6 | 19.3 | 18.8 | 19.9 |
| Viscosity [mPa · s], initial | 4'000 | 6'100 | 6'900 | 4'000 | 5'400 | 5'300 | 6'500 |
| Visc. [mPa · s], 28 d 40° C. | 4'900 | 6'400 | 7'300 | 4'850 | 5'200 | 4'900 | 7'200 |
| Tack-free Time [h] | 6.5 | 2.5 | 2.5 | 7.0 | 8.0 | 5.0 | 1.5 |
| Tensile Strength [MPa] | 3.40 | 5.4 | 5.1 | 3.2 | 3.0 | 3.9 | 5.5 |
| Elongation at Break [%] | 432 | 400 | 440 | 410 | 410 | 445 | 460 |

"Visc." means "Viscosity"
[1] 1-methoxy-2-propylacetate
[2] indicates the approximate ratio between the number of aldimino groups of the the aldimine of the formula (I) and the aldimine of the formula (II)

TABLE 2

Composition (in weight parts) and test results of the examples Ex-2 to Ex-9.

|  | Ex-2 | Ex-3 | Ex-4 | Ex-5 | Ex-6 | Ex-7 | Ex-8 | Ex-9 |
|---|---|---|---|---|---|---|---|---|
| Ingredients Given Above | 1719.8 | 1719.8 | 1719.8 | 1719.8 | 1719.8 | 1719.8 | 1719.8 | 1719.8 |
| Solvent[1] | 8.0 | 8.0 | 8.0 | 8.0 | 8.0 | 8.0 | 8.0 | 8.0 |
| DPK | 579.8 | 579.8 | 579.8 | 579.8 | 579.8 | 579.8 | 579.8 | 579.8 |
| Aldimine-A1 | 190.7 | 140.0 | 116.7 | — | — | — | 58.3 | — |
| Aldimine-A2 | — | — | — | 107.9 | 143.9 | — | 62.9 | 143.9 |
| Aldimine-A3 | — | — | — | — | — | 127.8 | — | — |
| Aldimine-B1 | — | — | — | 130.8 | 65.4 | 65.4 | — | — |
| Aldimine-B2 | 48.9 | 106.9 | 133.6 | — | — | — | 106.9 | 53.5 |
| NH$_2$/NCO | 0.70 | 0.70 | 0.70 | 0.70 | 0.70 | 0.70 | 0.70 | 0.70 |
| Eq Ald. (I)/Eq Ald. (II)[2] | 82/18 | 60/40 | 50/50 | 60/40 | 80/20 | 80/20 | 60/40 | 80/20 |
| VOC Content [g/l] | 19.6 | 19.5 | 19.4 | 19.5 | 19.9 | 20.1 | 19.7 | 20.1 |

TABLE 2-continued

Composition (in weight parts) and test results of the examples Ex-2 to Ex-9.

|  | Ex-2 | Ex-3 | Ex-4 | Ex-5 | Ex-6 | Ex-7 | Ex-8 | Ex-9 |
|---|---|---|---|---|---|---|---|---|
| Viscosity [mPa · s], initial | 6'300 | 5'800 | 5'700 | 5'800 | 7'400 | 5'100 | 6'200 | 6'800 |
| Visc. [mPa · s], 28 d 40° C. | 7'400 | 6'800 | 5'500 | 5'500 | 7'400 | 4'800 | 7'500 | 7'000 |
| Tack-free Time [h] | 2.5 | 6.0 | 8.0 | 6.0 | 5.0 | 6.0 | 8.0 | 5.0 |
| Tensile Strength [MPa] | 4.7 | 4.5 | 3.2 | 5.2 | 5.4 | 5.3 | 3.8 | 3.6 |
| Elongation at Break [%] | 460 | 520 | 370 | 540 | 510 | 630 | 400 | 260 |

"Visc." means "Viscosity"
[1]1-methoxy-2-propylacetate
[2]indicates the approximate ratio between the number of aldimino groups of the the aldimine of the formula (I) and the aldimine of the formula (II)

The invention claimed is:

1. A one-part moisture-curing liquid-applied waterproofing membrane comprising:
   at least one isocyanate-functional polyurethane polymer;
   at least one aldimine of the formula (I); and
   at least one aldimine of the formula (II),

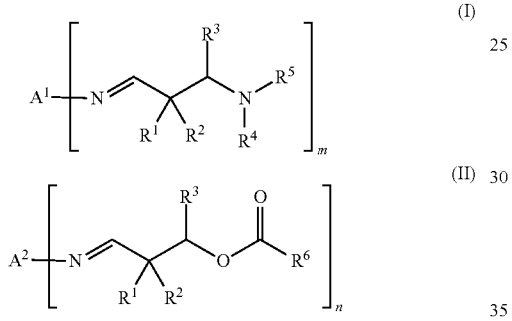

wherein
   $A^1$ is an m-valent hydrocarbyl moiety of molecular weight in a range of 28 to 5,000 g/mol optionally containing ether or urethane groups,
   $A^2$ is an n-valent hydrocarbyl moiety of molecular weight in a range of 28 to 5,000 g/mol optionally containing ether or urethane groups,
   $R^1$ and $R^2$ are the same or different $C_1$ to $C_{12}$ linear or branched alkyls, or are joined together to form a divalent linear or branched $C_4$ to $C_{12}$ hydrocarbyl moiety which is part of a 5- to 8-membered carbocyclic ring,
   $R^3$ is hydrogen or a linear or branched $C_1$ to $C_{12}$ alkyl or arylalkyl or alkoxycarbonyl,
   $R^4$ and $R^5$ are the same or different linear or branched $C_1$ to $C_{20}$ alkyl or cycloalkyl or aralkyl optionally containing ether groups, or are joined together to form a divalent linear or branched $C_4$ to $C_{12}$ hydrocarbyl moiety which is part of a 5- to 8-membered heterocyclic ring which, besides the nitrogen atom, may contain an ether or thioether or tertiary amino group,
   $R^6$ is a monovalent $C_6$ to $C_{20}$ hydrocarbyl moiety optionally containing ether, carbonyl or ester groups, and
   m and n are from 2 to 6;
   wherein the ratio between the number of the aldimino groups of the aldimine of the formula (I) and the aldimine of the formula (II) is in a range of 90/10 to 50/50,
   wherein the molecular weight refers to the molar mass (given in grams per mole) of a molecule or a part of a molecule and, for an oligomeric or polymeric mixture of molecules or moieties, to the number-average molecular weight (Mn).

2. The membrane according to claim 1, wherein the isocyanate-functional polymer is based on an aliphatic polyisocyanate.

3. The membrane according to claim 1, wherein
   $A^1$ is a divalent or a trivalent hydrocarbyl moiety of molecular weight in a range of 180 to 5,000 g/mol containing ether groups; and
   $A^2$ is a divalent hydrocarbyl moiety of molecular weight in a range of 28 to 400 g/mol.

4. The membrane according to claim 3, wherein
   the aldimine of the formula (I) is selected from the group consisting of: N,N'-bis(2,2-dimethyl-3-(N-morpholino)-propylidene)-polyoxypropylene diamine with an average molecular weight in a range of 500 to 4,400 g/mol and N,N',N''-tris(2,2-dimethyl-3-(N-morpholino)-propylidene)-polyoxypropylene triamine with an average molecular weight in a range of 860 to 5,500 g/mol; and
   the aldimine of the formula (II) is selected from the group consisting of: N,N'-bis(2,2-dimethyl-3-lauroyloxypropylidene)-hexamethylene-1,6-diamine and N,N'-bis(2,2-dimethyl-3-lauroyloxypropylidene)-3-aminomethyl-3,5,5-trimethylcyclohexylamine.

5. The membrane according to claim 1, wherein:
   $A^1$ is a divalent hydrocarbyl moiety of molecular weight in a range of 28 to 400 g/mol; and
   $A^2$ is a divalent or a trivalent hydrocarbyl moiety of molecular weight in a range of 180 to 5,000 g/mol containing ether groups.

6. The membrane according to claim 5, wherein:
   the aldimine of the formula (I) is selected from the group consisting of: N,N'-bis(2,2-dimethyl-3-(N-morpholino)-propylidene)-hexamethylene-1,6-diamine and N,N'-bis(2,2-dimethyl-3-(N-morpholino)-propylidene)-3-aminomethyl-3,5,5-trimethylcyclohexylamine; and
   the aldimine of the formula (II) is selected from the group consisting of: N,N'-bis(2,2-dimethyl-3-lauroyloxypropylidene)-polyoxypropylene diamine with an average molecular weight in a range of 700 to 4,600 g/mol and N,N',N''-tris(2,2-dimethyl-3-lauroyloxypropylidene)-polyoxypropylene triamine with an average molecular weight in a range of 1200 to 5,800 g/mol.

7. The membrane according to claim 1 comprising:
   at least one ingredient selected from the group consisting of: inorganic fillers and pigments;
   at least one ingredient selected from the group consisting of flame-retarding plasticizers and flame-retarding fillers; and at least one ingredient selected from the group consisting of catalysts, plasticizers, solvents and UV-stabilizers.

8. The membrane according to claim 1 containing
from 15 to 70 weight-% isocyanate-functional polyurethane polymers;
from 20 to 80 weight-% of fillers including inorganic fillers, flame-retarding fillers and pigments;
from 5 to 30 weight-% of plasticizers including flame-retarding plasticizers;
and comprising:
at least one further ingredient selected from the group consisting of catalysts, solvents and UV-stabilizers.

9. The membrane according to claim 1 having a Brookfield viscosity in a range of 2,000 to 15,000 mPa·s at 20° C.

10. The membrane according to claim 1 containing 50 g VOC per liter or less.

11. The membrane according to claim 1, in combination with a roof.

12. A waterproofing system, consisting of:
optionally a primer and/or an undercoat;
one or more than one layer of the membrane according to claim 1; and
optionally a top coat.

13. A method of waterproofing a roof structure having a one-part moisture-curing liquid-applied waterproofing membrane including:
at least one isocyanate-functional polyurethane polymer;
at least one aldimine of the formula (I); and
at least one aldimine of the formula (II),

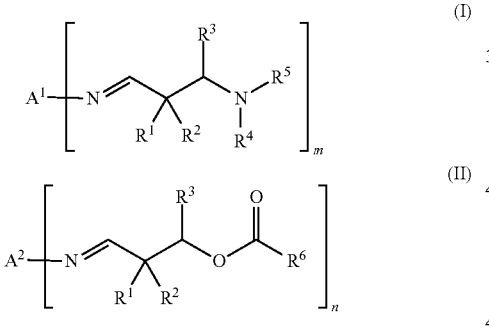

wherein
$A^1$ is an m-valent hydrocarbyl moiety of molecular weight in a range of 28 to 5,000 g/mol optionally containing ether or urethane groups,
$A^2$ is an n-valent hydrocarbyl moiety of molecular weight in a range of 28 to 5,000 g/mol optionally containing ether or urethane groups,
$R^1$ and $R^2$ are the same or different $C_1$ to $C_{12}$ linear or branched alkyls, or are joined together to form a divalent linear or branched $C_4$ to $C_{12}$ hydrocarbyl moiety which is part of a 5- to 8-membered carbocyclic ring,
$R^3$ is hydrogen or a linear or branched $C_1$ to $C_{12}$ alkyl or arylalkyl or alkoxycarbonyl,
$R^4$ and $R^5$ are the same or different linear or branched $C_1$ to $C_{20}$ alkyl or cycloalkyl or aralkyl optionally containing ether groups, or are joined together to form a divalent linear or branched $C_4$ to $C_{12}$ hydrocarbyl moiety which is part of a 5- to 8-membered heterocyclic ring which, besides the nitrogen atom, may contain an ether or thioether or tertiary amino group, $R^6$ is a monovalent $C_6$ to $C_{20}$ hydrocarbyl moiety optionally containing ether, carbonyl or ester groups, and
m and n are from 2 to 6;
wherein the ratio between the number of the aldimino groups of the aldimine of the formula (I) and the aldimine of the formula (II) is in a range of 90/10 to 50/50,
wherein the molecular weight refers to the molar mass (given in grams per mole) of a molecule or a part of a molecule and, for an oligomeric or polymeric mixture of molecules or moieties, to the number-average molecular weight (Mn),
the method comprising:
applying the membrane in liquid state onto a substrate of the roof structure in a layer thickness in a range of 0.5 to 3 mm;
contacting the membrane with a fibre reinforcement mesh within an open time of the membrane;
exposing the membrane to moisture to thereby cure the membrane partially or fully to obtain an elastic coating; and
optionally applying a second layer of the membrane in a layer thickness in a range of 0.5 to 3 mm and curing it by exposure to moisture.

14. A waterproof roof structure, obtained by the method according to claim 13.

15. A method of applying at least one aldimine of the formula (II) as a diluent in a one-part moisture-curing liquid-applied waterproofing membrane having at least one isocyanate-functional polyurethane polymer and at least one aldimine of the formula (I),

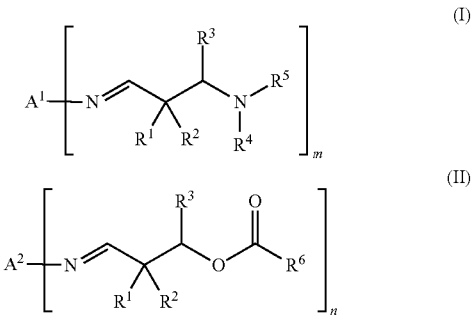

wherein
$A^1$ is an m-valent hydrocarbyl moiety of molecular weight in a range of 28 to 5,000 g/mol optionally containing ether or urethane groups,
$A^2$ is an n-valent hydrocarbyl moiety of molecular weight in a range of 28 to 5,000 g/mol optionally containing ether or urethane groups,
$R^1$ and $R^2$ are the same or different $C_1$ to $C_{12}$ linear or branched alkyls, or are joined together to form a divalent linear or branched $C_4$ to $C_{12}$ hydrocarbyl moiety which is part of a 5- to 8-membered carbocyclic ring,
$R^3$ is hydrogen or a linear or branched $C_1$ to $C_{12}$ alkyl or arylalkyl or alkoxycarbonyl,
$R^4$ and $R^5$ are the same or different linear or branched $C_1$ to $C_{20}$ alkyl or cycloalkyl or aralkyl optionally containing ether groups, or are joined together to form a divalent linear or branched $C_4$ to $C_{12}$ hydrocarbyl moiety which is part of a 5- to 8-membered heterocyclic ring which, besides the nitrogen atom, may contain an ether or thioether or tertiary amino group, $R^6$ is a monovalent $C_6$ to $C_{20}$ hydrocarbyl moiety optionally containing ether, carbonyl or ester groups, and m and n are from 2 to 6, wherein the ratio between the number of the aldimino groups of the aldimine of the formula (I) and the aldimine of the formula (II) is in a range of 90/10 to 50/50, wherein the molecular weight refers to the molar mass (given in grams per mole) of a molecule or a part of a molecule and, for an oligomeric or polymeric mixture of molecules or moieties, to the number-average molecular weight (Mn), the method comprising:
forming a composition comprising the at least one aldimine of the formula (II) and the at least one aldimine of the formula (I).

16. The membrane according to claim 1, wherein:
$A^1$ contains ether or urethane groups;
$A^2$ contains ether or urethane groups; and
$R^4$ and $R^5$ contain ether groups.

17. The membrane according to claim 2, wherein
$A^1$ is a divalent or a trivalent hydrocarbyl moiety of molecular weight in a range of 180 to 5,000 g/mol containing ether groups; and
$A^2$ is a divalent hydrocarbyl moiety of molecular weight in a range of 28 to 400 g/mol.

18. The membrane according to claim 2, wherein:
$A^1$ is a divalent hydrocarbyl moiety of molecular weight in a range of 28 to 400 g/mol; and
$A^2$ is a divalent or a trivalent hydrocarbyl moiety of molecular weight in a range of 180 to 5,000 g/mol containing ether groups.

19. The membrane according to claim 6 comprising:
at least one ingredient selected from the group consisting of: inorganic fillers and pigments;
at least one ingredient selected from the group consisting of flame-retarding plasticizers and flame-retarding fillers; and
at least one ingredient selected from the group consisting of catalysts, plasticizers,
solvents and UV-stabilizers.

20. The membrane according to claim 19 containing
from 15 to 70 weight-% isocyanate-functional polyurethane polymers;
from 20 to 80 weight-% of fillers including inorganic fillers, flame-retarding fillers and pigments;
from 5 to 30 weight-% of plasticizers including flame-retarding plasticizers;
and comprising:
at least one further ingredient selected from the group consisting of catalysts, solvents and UV-stabilizers.

21. The waterproofing system of claim 12, wherein the one or more than one layer of the membrane according to claim 1 is in combination with a fiber reinforcement mesh.

22. The membrane according to claim 1, wherein the ratio between the number of the aldimino groups of the aldimine of the formula (I) and the aldimine of the formula (II) is in a range of 90/10 to 60/40.

* * * * *